C. E. Miller.
Wash Boiler.
Nº 89,545. Patented Apr. 27, 1869.
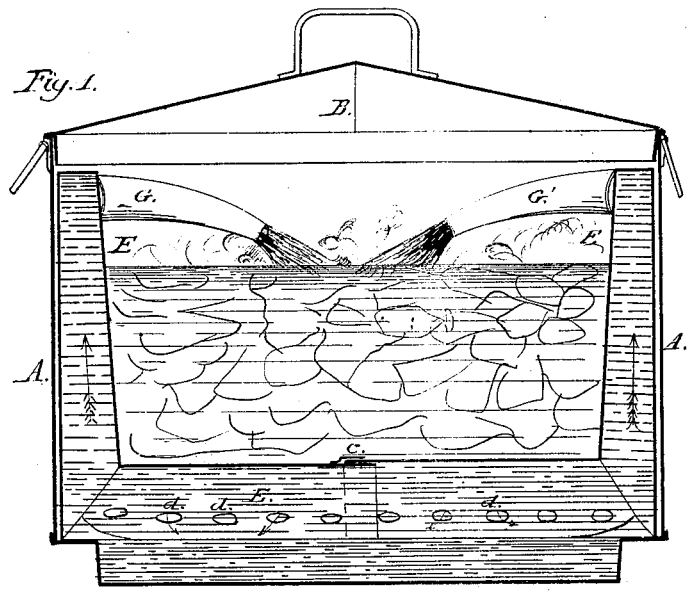
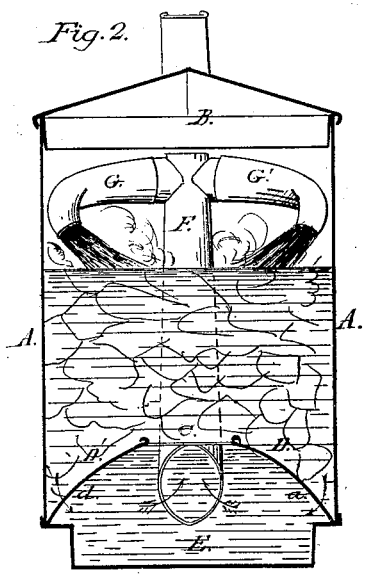
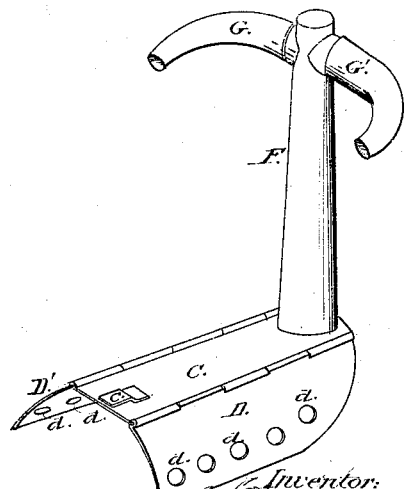
Attest:
Chas Bauer
Jas. H. Layman.
Inventor:
C. E. Miller
By Knight Bros
Attys.

CHARLES E. MILLER, OF INDIANAPOLIS, INDIANA.

Letters Patent No. 89,545, dated April 27, 1869; antedated October 27, 1868.

IMPROVEMENT IN WASH-BOILERS.

The Schedule referred to in these Letters Patent and making part of the same.

*To whom it may concern:*

Be it known that I, CHARLES E. MILLER, of Indianapolis, Marion county, Indiana, have invented a new and useful Improvement in Wash-Boilers; and I hereby declare the following to be a full, clear, and exact description thereof, reference being had to the accompanying drawings, making part of this specification.

My invention relates to the class of devices known as automatic or self-acting-washers, whereby the water in a wash-boiler is caused to assume a more rapid and effective circulation; and My invention consists in the employment of vertical spouts, attached to a removable diaphragm or false bottom, which is made in two pieces, so as to be adjustable in length, and provided with hinged flaps, to adapt it to fit the boiler in width, whereby such a device may be applied to any ordinary wash-boiler, whether large or small.

Figure 1 is a longitudinal section, and

Figure 2, a transverse section of a boiler provided with my attachment.

Figure 3 shows one of my spouts detached.

A represents the body, and B the cover of a common wash-boiler.

My "spouts," two in number, are constructed as follows, the same description answering for both:

A plate, C, slightly more than half the length of the boiler, and having connected to it, by hinges H, a pair of flaps or wings, D D', perforated at *d*, forms, in conjunction with a similar plate and wings, pertaining to the other spout, a chamber, E, which extends the entire length of the boiler.

From each plate C, near its outer end, rises a column, F, which may terminate in two adjustable nozzles, G G', similar to those described in my patent of June 23, 1868.

The portions of the two spouts which unite, to form the chamber E, are so proportioned as for one to overlap the other, and be held in place by a tongue, C, thereupon, as seen in fig. 1.

The operation of the apparatus is clearly shown by the arrows, and consists essentially in the circulation of the water through the apertures *d* into the chamber E, its ascent through the columns F, and escape, in the form of jets, from the nozzles G G', on to and through the clothes, to again enter the chamber E, and becoming heated therein, to be again ejected from the spouts, and so on, in repetition, as long as may be necessary.

It is manifest that the peculiar construction of those parts of the spouts constituting the chamber E, enables them to be applied to any ordinary-sized washboiler, so that it will only be necessary, in most cases, to furnish the spouts, and the apparatus is complete.

I claim herein as new, and of my invention—

The combination of the false bottom C, perforated hinged flaps D D', columns F, and nozzles G G', all constructed and arranged to operate substantially as and for the purposes herein described.

In testimony of which invention, I hereunto set my hand.

CHARLES E. MILLER.

Witnesses:
GEO. H. KNIGHT,
ISAAC WARING.